United States Patent [19]

Ikeda et al.

[11] 4,237,487
[45] Dec. 2, 1980

[54] MONOLITHIC SEMICONDUCTOR INTEGRATED CIRCUIT FOR TELEVISION RECEIVERS

[75] Inventors: Tsuneo Ikeda, Kodaira; Yasuhiro Nunogawa, Fuchu, both of Japan

[73] Assignee: Hitachi, Ltd., Japan

[21] Appl. No.: 60,752

[22] Filed: Jul. 26, 1979

[30] Foreign Application Priority Data

Aug. 21, 1978 [JP] Japan .................................. 53/100942

[51] Int. Cl.³ .......................... H04N 5/08; H04N 5/10
[52] U.S. Cl. .................................. 358/154; 358/153; 358/188; 358/177
[58] Field of Search ............................... 358/153–157, 358/148, 188, 177; 328/139

[56] References Cited

PUBLICATIONS

Cense et al., "IC Signal-Processing Circuit for TV Receivers," *IEEE Journal of Solid-State Circuits,* vol. SC-4, No. 4, Aug. 1969, pp. 202-210.

*Primary Examiner*—John C. Martin
*Attorney, Agent, or Firm*—Craig and Antonelli

[57] ABSTRACT

A monolithic semiconductor integrated circuit for television receivers includes a video intermediate-frequency amplifier circuit, a video detector circuit and a sync separator circuit. The video intermediate-frequency signals are fed to said video intermediate-frequency amplifier circuit via an externally located input terminal of the integrated circuit. The sync separator circuit sends sync separator output signals to an output terminal of the integrated circuit. A low-pass filter is specifically connected between said output terminal of the integrated circuit and said sync separator circuit. The time constant of the low-pass filter is so selected that the pulse width of the sync separator output signals obtained from said output terminal is nearly equal to the pulse width of horizontal sync pulses in the composite video signals and that harmonic components in the horizontal sync pulses are reduced.

7 Claims, 5 Drawing Figures

MONOLITHIC SEMICONDUCTOR INTEGRATED CIRCUIT FOR TELEVISION RECEIVERS

BACKGROUND OF THE INVENTION

The present invention is concerned with a monolithic semiconductor integrated circuit for television receivers.

A signal processing circuit formed in a monolithic semiconductor integrated circuit for television receivers has been known, for example, in IEEE JOURNAL OF SOLID-STATE CIRCUITS, Vol. SC-4, No. 4, pp. 202–210, published in August, 1969.

On the outer side of the monolithic semiconductor integrated circuit have been arrayed a tuner, a video intermediate-frequency amplifier, and a video detector. The video intermediate-frequency output signals obtained from the tuner are amplified by the video intermediate-frequency amplifier, and the output of the video intermediate-frequency amplifier is applied to the input of the video detector. The detected signals produced by the video detector are fed to the input of a video amplifier in the monolithic semiconductor integrated circuit. The video output signals of the video amplifier in the integrated circuit are fed to the input of a sync separator in the integrated circuit. The outputs of the sync separator are fed to a vertical oscillation output circuit and to a horizontal oscillation output circuit.

In developing a monolithic semiconductor integrated circuit for television receivers, having a video intermediate-frequency amplifier, a video detector, a sync separator and the like formed in a single semiconductor chip, the inventors of the present invention have encountered the below-mentioned difficulty.

The output response of a sync separator circuit in a television receiver takes the form of sharp pulse-like waveforms, and has great output voltage. Therefore, if a high-frequency amplifier circuit such as video intermediate-frequency amplifier and the sync separator circuit are constructed in the form of a single monolithic semiconductor integrated circuit, harmonic components of the sync pulse are fed back to the high-frequency amplifier circuit, giving rise to the occurrence of oscillation and crosstalk. To prevent such inconveniences, therefore, the high-frequency high-gain circuit and the sync separator circuit had to be constructed in the form of separate monolithic semiconductor integrated circuits.

SUMMARY OF THE INVENTION

The object of the present invention, therefore, is to preclude unstable factors such as oscillation or crosstalk from a monolithic semiconductor integrated circuit for television receivers, having a high-frequency amplifier circuit such as video intermediate-frequency amplifier and a sync separator circuit in a single semiconductor chip.

According to a fundamental feature of the present invention for achieving the abovementioned object, a low-pass filter is provided on the output side of the sync separator circuit to suppress harmonic components of the sync separation output, whereby unstable factors such as oscillation and the like are removed.

BRIEF DESCRIPTION OF THE DRAWINGS

Diagrams (A) to (D) of FIG. 4 show signal waveforms in each of the circuit blocks of FIG. 2.

PREFERRED EMBODIMENT OF THE INVENTION

The invention is concretely mentioned below with reference to an embodiment.

Figure 1:
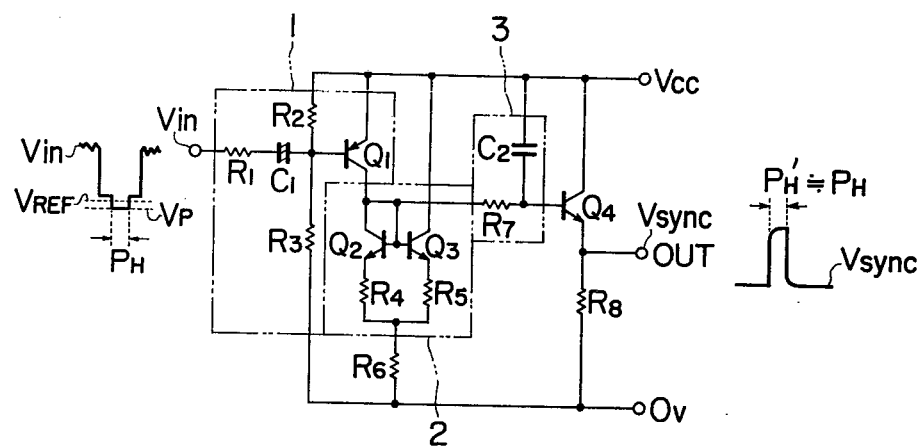
FIG. 1 is a circuit diagram of a sync separator circuit in a monolithic semiconductor integrated circuit for television receivers according to an embodiment of the present invention.

FIG. 1 is a circuit diagram of the sync separator circuit according to the present invention.

The circuit consists of a base-time-constant-type sync separator transistor circuit 1, an output gain enhancing circuit 2, a low-pass filter 3 and an emitter-follower output circuit.

According to the above base-time-constant-type sync separator transistor circuit 1, a pnp transistor $Q_1$ works as a sync separator transistor, a voltage divided by resistors $R_2$ and $R_3$ is used as a base biasing voltage, a composite video signal Vin is introduced through a series circuit consisting of a resistor $R_1$ and a capacitor $C_1$, and a sync signal Vsync is extracted from the composite video signal coming out from the collector of the transistor $Q_1$.

The transistor $Q_1$ is rendered conductive by the level Vp of a peak value of the sync signal in the composite video signal, whereby the capacitor $C_1$ is electrically charged. After the sync signal passed through, the electric charge stored in the capacitor $C_1$ is discharged through the resistors $R_2$ and $R_3$. If the time constant for discharge is set to be greater than a horizontal period, the transistor $Q_1$ is rendered nonconductive for a period in which the video signal is being introduced. Therefore, the sync signal Vsync can be extracted from the collector of the transistor $Q_1$.

The output gain enhancing circuit 2 and the resistor $R_6$ constitute a collector load for the sync separator transistor $Q_1$.

The output gain enhancing circuit consists of a diode-connected transistor $Q_2$, a resistor $R_4$ connected to the emitter of the transistor $Q_2$, a transistor $Q_3$ of which the base is connected to the base of the transistor $Q_2$ and of which the collector is connected to a power-supply terminal Vcc, and a resistor $R_5$ connected to the emitter of the transistor $Q_3$. The other ends of the emitter resistors $R_4$ and $R_5$ have been commonly connected to the resistor $R_6$.

In the circuit 2, if the transistors $Q_2$ and $Q_3$ of the same size are employed, emitter currents will flow in reverse proportion to the resistances of the emitter resistors $R_4$ and $R_5$. For instance, if the ratio of the resistance $R_4$ to the resistance $R_5$ is set to be 4 to 1, the emitter current of the transistor $Q_3$ will be four times greater than the emitter current of the transistor $Q_2$. The emitter current of the transistor $Q_2$ is determined by the collector current of the synchronizing separator transistor $Q_1$. Accordingly, the sum of currents of the two transistors $Q_2$ and $Q_3$ which flows into the load resistor $R_6$ is five times greater than the output current of the transistor $Q_1$; the gain of the transistor $Q_1$ is substantially enhanced.

A resistor $R_7$ and a capacitor $C_2$ connected to the collector of the transistor $Q_1$ constitute a low-pass filter 3 which removes harmonic components of the synchronous pulse obtained from the collector of the transistor $Q_1$. Especially, when the sync separator circuit and the video intermediate-frequency amplifier circuit are to be constructed in the form of a single monolithic semiconductor integrated circuit, the time constant should be so selected that harmonic components close to the video intermediate-frequency signals, or harmonic components close to, for example, 58.75 MHz are removed.

An emitter-follower output circuit consists of a transistor $Q_4$ to which is fed the sync pulses via the low-pass filter 3, and an emitter resistor $R_8$ for the transistor $Q_4$.

The sync pulses Vsync obtained through the emitter-follower output circuit describe an output waveform having a pulse width $P_H'$ nearly equal to the pulse width $P_H$ of the horizontal synchronizing signals without containing harmonic components as shown in the drawing.

Figure 2:
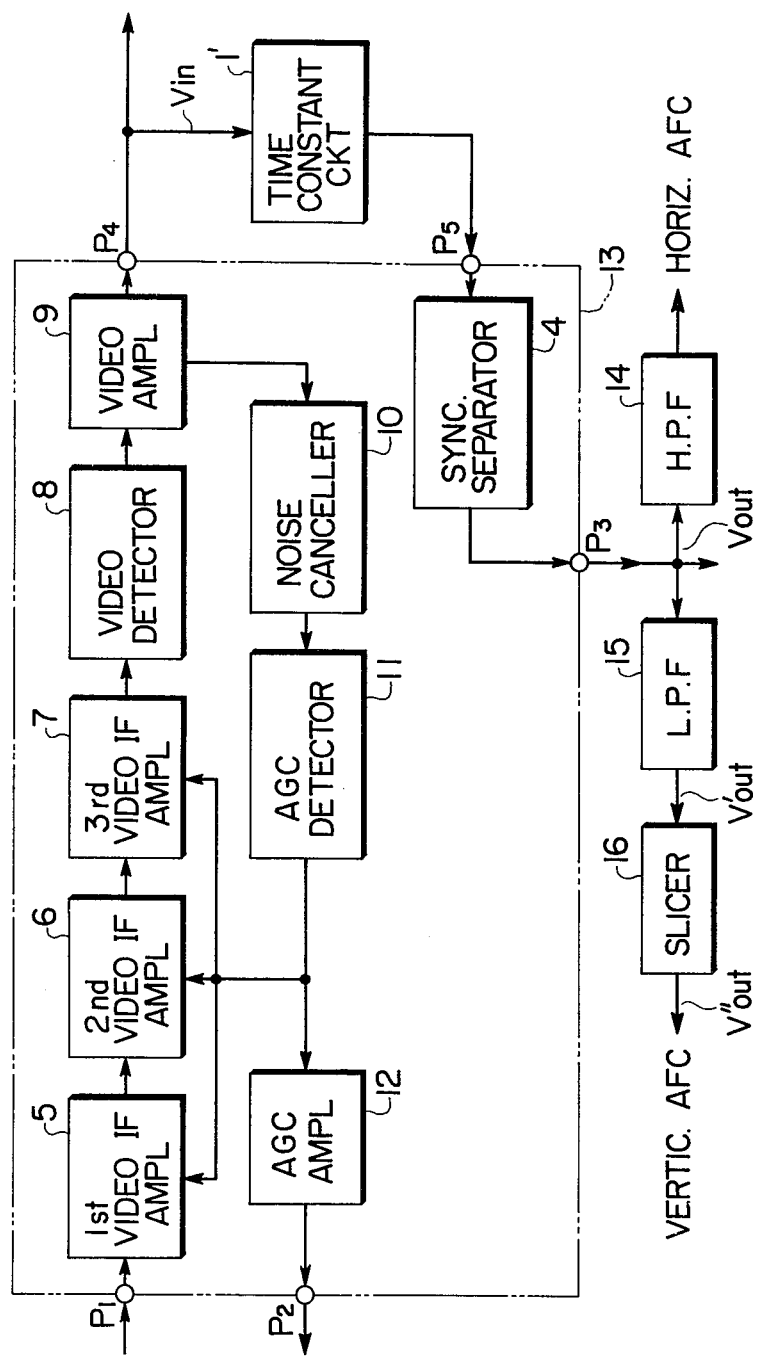
FIG. 2 is a block diagram of a signal processing circuit formed in the monolithic semiconductor integrated circuit for television receivers according to the embodiment of the present invention.

Even when the sync separator circuit 4 consisting of transistors $Q_1$ to $Q_4$, resistors $R_4$ to $R_8$ and capacitor $C_2$, is formed in an monolithic semiconductor integrated circuit 13 containing video intermediate-frequency amplifier circuits 5 to 7 which are high-frequency high-gain circuits as shown in FIG. 2, sync pulses from which have been removed harmonic components are produced at a sync separator output terminal $P_3$. Therefore, the quantity of high-frequency components fed back to the input terminal $P_1$ of the video intermediate-frequency amplifier circuit 5 can be greatly reduced despite the presence of capacitive coupling between terminals in the monolithic semiconductor integrated circuit. Consequently, the problem such as oscillation does not occur.

Here, a time-constant circuit 1' on the outer side of the integrated circuit has been composed of voltage-dividing resistors $R_2$ and $R_3$, a resistor $R_1$ and a capacitor $C_1$, which are connected in series.

Namely, as shown in FIG. 2, the monolithic semiconductor integrated circuit 13 for television sets incorporates a video intermediate-frequency amplifier circuit made up of a first video intermediate-frequency amplifier circuit 5, a second video intermediate-frequency circuit 7, as well as a video detector circuit 8 which receives the output of the video intermediate-frequency amplifier circuit, a video amplifier circuit 9 which receives the output of the video detector circuit 8, a noise canceller circuit 10 which receives the output of the video amplifier circuit 9, an AGC (automatic gain control) detector circuit 11 which receives the composite video signals via the noise canceller circuit 10, a sync separator circuit 4, and an AGC amplifier circuit 12 which receives the output of the AGC detector circuit 11.

An intermediate-frequency output of a tuner circuit is applied to the input terminal $P_1$ of the first video intermediate-frequency amplifier circuit 5. The gains of the first, second and third video intermediate-frequency amplifier circuits 5, 6 and 7 are controlled by the output of the AGC detector circuit 11. The AGC amplifier circuit 12 compares an internal reference voltage with an output voltage from the AGC detector circuit 11, and gives a gain control signal to the tuner circuit via an externally located terminal $P_2$.

The output of the sync separator circuit is obtained through the externally located terminal $P_3$; sync pulses (horizontal sync pulses) will also be sent to a horizontal AFC (automatic frequency control) circuit, horizontal oscillation circuit and the like through the externally located terminal $P_3$.

An externally located terminal $P_4$ is to obtain composite video signals which will be fed to the video amplifier circuit, band pass amplifier circuit and the like.

The circuit 1' having the same time constant as that determined by the resistors $R_1$ to $R_3$ and the capacitor $C_1$ of FIG. 1 is connected between the terminal $P_4$ and a terminal $P_5$ of the semiconductor integrated circuit 13. Therefore, the circuit same as the circuit consisting of transistors $Q_1$ to $Q_3$, resistors $R_4$ to $R_8$, and capacitor $C_2$ of FIG. 1 incorporated in the semiconductor integrated circuit 13, produces sync separation signals to the terminal $P_3$.

The horizontal sync pulses sent to the horizontal AFC circuit and to the horizontal oscillation circuit (not shown) can be obtained from the output terminal $P_3$ via a high-pass filter (differentiation circuit) 14 outside the integrated circuit. The vertical sync pulses sent to the vertical AFC circuit and to the vertical oscillation circuit (not shown), on the other hand, can be obtained from the output terminal $P_3$ via a low-pass filter (integration circuit) 15 and a slicer circuit 16 outside the integrated circuit.

Figure 4:
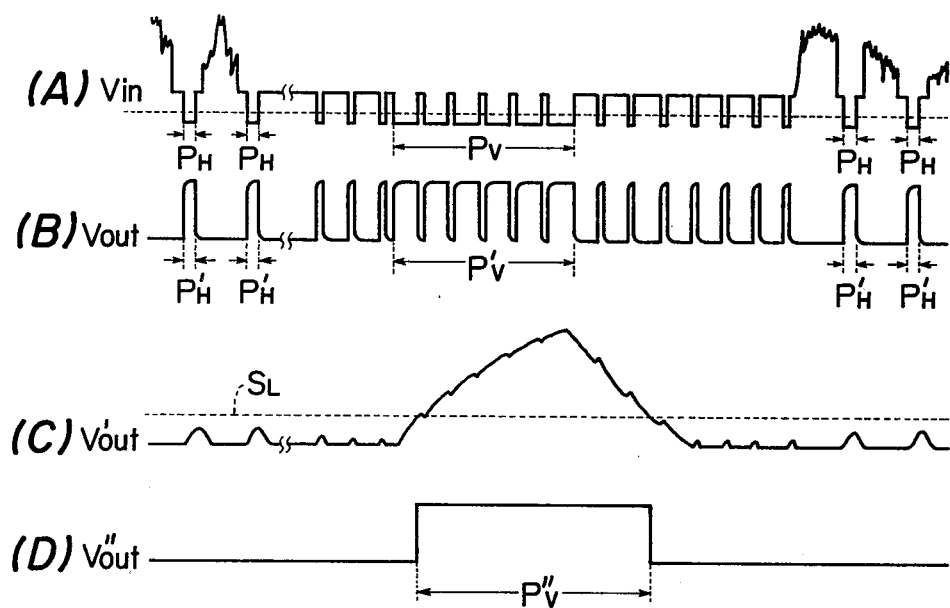

Diagrams (A) to (C) of FIG. 4 show signal waveforms of each of the circuit blocks of FIG. 2, in which the diagram (A) of FIG. 4 shows signal waveforms (composite video signals) Vin obtained from the output terminal $P_4$ of the video amplifier circuit 9, the diagram (B) of FIG. 4 shows sync signals Vout obtained from the output terminal $P_3$ of the sync separator circuit 4, wherein the sync signals Vout include vertical sync signals of a width of a period P'v, the diagram (C) of FIG. 4 shows output waveforms of the low-pass filter 15, and the diagram (D) of FIG. 4 shows a vertical sync pulse produced by the slicer circuit 16, wherein the vertical sync pulse has a pulse width of a period P''v which is nearly equal to a period P'v of the vertical sync signals.

The capacitor $C_2$ of the low-pass filter 3 may be connected between the base of the transistor $Q_4$ of the emitter-follower output circuit and a ground point of the circuit. With respect to the semiconductor integrated circuit, however, it is better to connect the capacitor $C_2$ between the base of the transistor $Q_4$ and the power-supply terminal as shown in FIG. 1. In this case, the resistors $R_7$, $R_8$, capacitor $C_2$ and terminal $Q_4$ can be formed in a common semiconductor region, instead of being formed in the semiconductor regions which are electrically isolated from each other. Therefore, areas of semiconductor regions for electrical isolation need not be provided.

Figure 3:
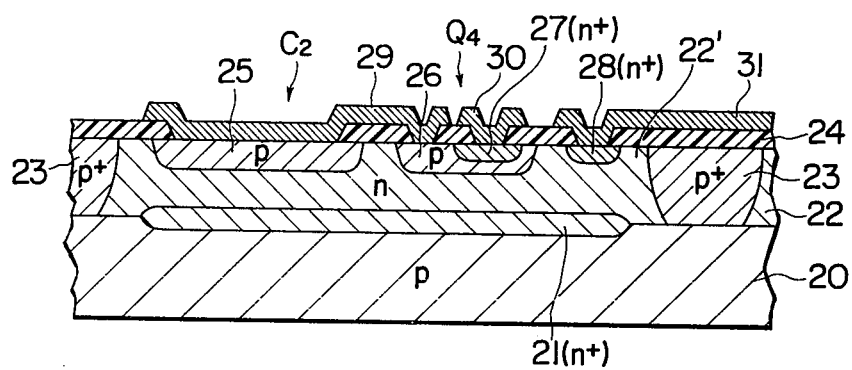
FIG. 3 is a cross-sectional view of a transistor and a capacitor in the sync separator circuit in the monolithic semiconductor integrated circuit for television receivers according to the embodiment of the present invention.

FIG. 3 is a cross-sectional view of the transistor $Q_4$ and capacitor $C_2$ in the semiconductor integrated circuit. In FIG. 3, reference numeral 20 denotes a p-type silicon substrate, 21 an $n^+$-type buried layer, 22 an n-type epitaxial-growth layer formed on the substrate 20, and reference numeral 23 represents a $p^+$-type isolation region. A portion 22' in the n-type epitaxial-growth layer 22 is electrically isolated from other portions by means of the p-type silicon substrate 21 and the p+-type isolation region 23.

The capacitor $C_2$ consists of a pn-junction capacity between the n-type layer 22' and the p-type region 25. The transistor $Q_4$ consists of the n-type layer 22' that serves as a collector, a p-type base region 26, and an n+-type emitter region 27.

On the surface of the n-type layer 22 has been formed a silicon oxide film 24. On the silicon oxide film has further been formed wirings 29, 30, 31 composed of an aluminum film.

The p-type region 25 will be formed, for example, simultaneously with the base region 26 of the transistor $Q_4$. Although not shown, the resistors $R_7$ and $R_8$ are formed as p-type semiconductive resistance regions on the surface of the n-type layer 22' simultaneously with the base region 26.

As mentioned above, the television receiver circuits that were so far formed in two chips or three chips, can now be formed in one chip according to the embodiment of the present invention. Therefore, the number of parts constituting the television receiver circuits can be reduced, to decrease the manufacturing cost and to increase the reliability.

The present invention shall not, of course, be limited to the abovementioned embodiment only. Any syn separator circuit may be formed in the single monolithic semiconductor integrated circuit together with the high-frequency high-gain circuit, provided the output portion is equipped with a low-pass filter.

Further, the circuits other than the high-frequency high-gain circuits and syn separator circuits, may be combined in a variety of ways.

Figure 5:
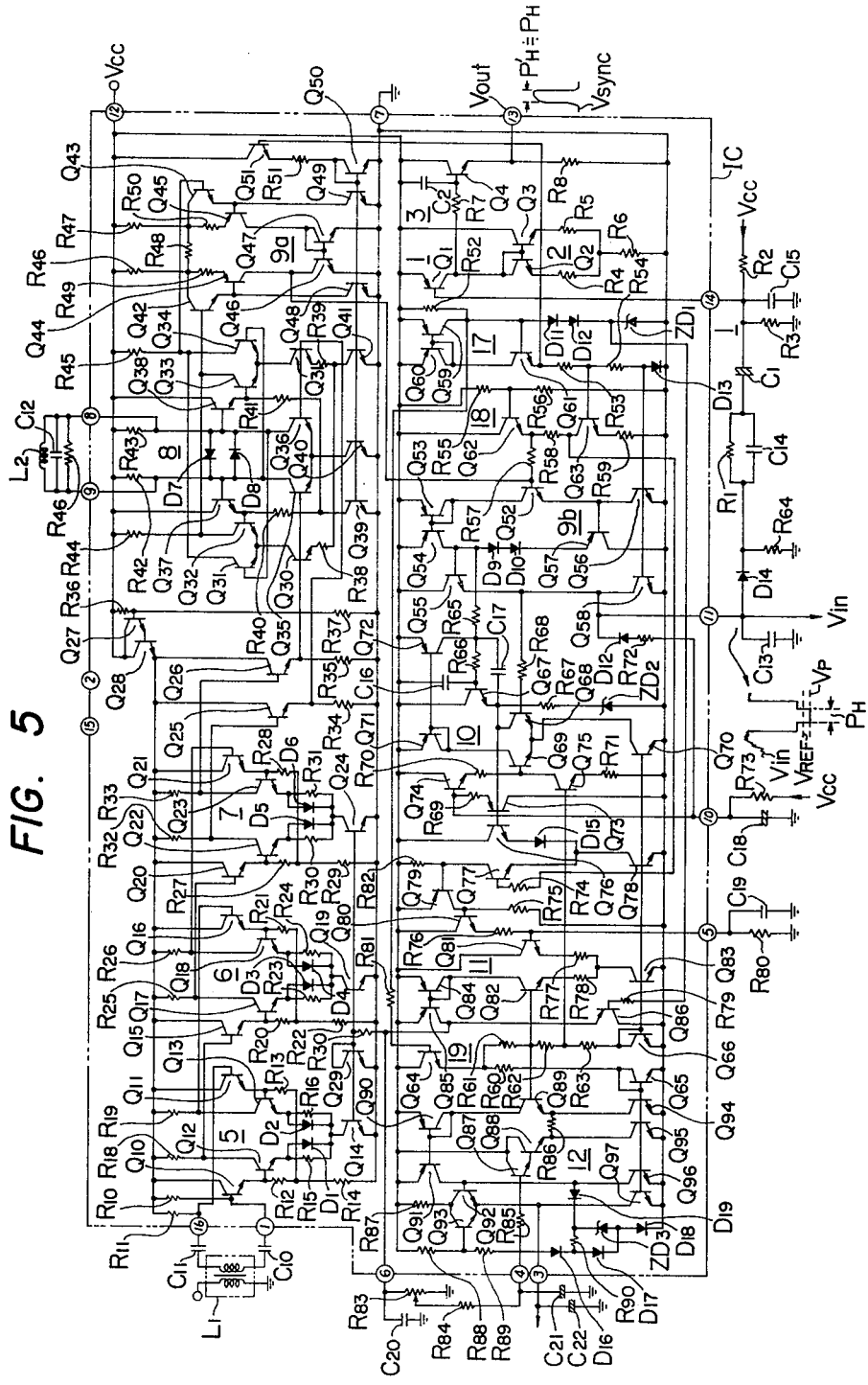
FIG. 5 shows an internal circuit and an external peripheral circuit of the signal processing circuit formed in the monolithic semiconductor circuit for television receivers according to the embodiment of the present invention.

FIG. 5 shows an internal circuit of the signal processing circuit formed in the monolithic semiconductor integrated circuit according to the concrete embodiment of the present invention, and the external peripheral circuits. The circuit elements in a broken line IC have been formed in a single silicon chip. On the other hand, the circuit elements outside the broken line IC are discrete elements located outside the semiconductor integrated circuit.

Numerical figures in circles denote the numbers of the external connection terminals.

The video intermediate-frequency output signals of a tuner of a television receiver are fed to input terminals 1 and 16 of the integrated circuit via a band pass filter having predetermined band pass characteristics (for example, 54,25 to 60.25 MHz). The secondary terminals of a video intermediate-frequency transformer $L_1$ constituting a portion of the band pass filter, are connected to the input terminals 1 and 16 via input coupling capacitors $C_{10}$ and $C_{11}$.

The first video intermediate-frequency amplifier circuit 5 consists of transistors $Q_{10}$ and $Q_{14}$, diodes $D_1$ and $D_2$, and resistors $R_{10}$ and $R_{19}$. The video intermediate-frequency signals applied to the input terminals 1, 16 are then applied to the bases of a pair of differential transistors $Q_{12}$ and $Q_{13}$ via emitter-follower transistors $Q_{10}$ and $Q_{11}$. The differential output signals of the first video intermediate-frequency amplifier circuit 5 are generated on the load resistors $R_{18}$ and $R_{19}$, and are transmitted to the second video intermediate-frequency amplifier circuit 6.

The AGC signals sent from the AGC detector circuit 11 to the terminal 6 are applied to a series circuit of resistor $R_{30}$ and transistor $Q_{29}$. As the AGC signals increase, the current flowing into the series circuit is increased. The increase in current helps increase a collector current of a current source transistor $Q_{14}$ in the first video intermediate-frequency amplifier circuit 5. When the collector current increases above a predetermined value, the diodes $D_1$ and $D_2$ are rendered conductive. The dynamic resistances of the diodes $D_1$ and $D_2$ when the diodes $D_1$ and $D_2$ are rendered conductive is decreased with the increase in the collector current, whereby the voltage gain of the first video intermediate-frequency amplifier circuit 5 is increased. When the collector current is below the predetermined value, the diodes $D_1$ and $D_2$ are rendered non-conductive. In this case, the voltage gain is determined by the resistances $R_{15}$ and $R_{16}$ connected to the emitters of the pair of differential transistors $Q_{12}$ and $Q_{13}$, whereby the voltage gain is decreased.

The second video intermediate-frequency amplifier circuit 6 consists of transistors $Q_{15}$ to $Q_{19}$, diodes $D_3$ and $D_4$, and resistors $R_{20}$ to $R_{26}$, and the third video intermediate-frequency amplifier circuit 7 consists of transistors $Q_{20}$ to $Q_{24}$, diodes $D_5$ and $D_6$, and resistors $R_{27}$ to $R_{33}$. These circuits 6 and 7 operate in the same manner as the abovementioned first video intermediate-frequency amplifier circuit 5. Therefore, their operation is not mentioned here.

The differential output signals of the third video intermediate-frequency amplifier circuit 7 are transmitted to the video detector circuit 8 via emitter-follower transistors $Q_{25}$ and $Q_{26}$.

A power-supply terminal 12 is served with a power-supply voltage Vcc which is divided by the resistors $R_{36}$ and $R_{37}$. The thus divided voltage is supplied as an operation voltage to the first, second and third intermediate-frequency amplifier circuits 5, 6 and 7 via emitter-follower transistors $Q_{27}$ and $Q_{28}$.

The video detector circuit 8 consists of transistors $Q_{31}$ to $Q_{41}$, diodes $D_7$ and $D_8$, resistors $R_{38}$ to $R_{45}$, and a resonance circuit ($L_2$, $C_{12}$, $R_{46}$) which is connected between terminals 8 and 9 of the integrated circuit and which is tuned to 58.75 MHz. The detector circuit of this type is called synchronous low-level detector, and has been reported in the IEEE TRANSACTIONS ON BROADCAST AND TELEVISION RECEIVERS, Vol. BTR-15, No. 2, pp. 159—166, published in July, 1969.

The video detected outputs obtained on the resistors $R_{44}$ and $R_{45}$ are transmitted to the first video amplifier circuit 9a. The first video amplifier circuit 9a consists of transistors $Q_{42}$ to $Q_{51}$, and resistors $R_{46}$ to $R_{51}$ and produces an output signal on the collector of the transistor $Q_{44}$. The output signal is transmitted to the second video amplifier circuit 9b which is consisting of transistors $Q_{52}$ to $Q_{58}$, and diodes $D_9$ and $D_{10}$, and which produces a composite video signal Vin as shown in the diagram (A) of FIG. 4 on the terminal 11.

A first biasing circuit 17 consisting of transistors $Q_{59}$ to $Q_{61}$, diodes $D_{11}$, $D_{12}$ and $D_{13}$, a Zener diode $ZD_1$, and resistors $R_{52}$ to $R_{54}$, a second biasing circuit 18 consisting of transistors $Q_{62}$ and $Q_{63}$, and resistors $R_{55}$ to $R_{59}$, and a third biasing circuit 19 consisting of transistors $Q_{64}$ to $Q_{66}$, and resistors $R_{60}$ and $R_{63}$, respectively supply biasing voltages to various circuits in the integrated circuit.

The composite video signal Vin transmitted to the terminal 11 is sent to a syn separator input terminal 14. A circuit network consisting of a diode $D_{14}$, resistors $R_1$ to $R_3$, $R_{64}$, and capacitors $C_1$, $C_{13}$ and $C_{14}$ is connected between the terminals 11 and 14. The diode $D_{14}$ in the circuit network mitigates negative pulse-like noises contained in the composite video signals Vin.

Essentially, the composite video signals Vin are applied to the base of the transistor $Q_1$ in the syn separator circuit 1 via a series circuit consisting of the resistor $R_1$ and the capacitor $C_1$. The operation of the output gain enhancing circuit 2 and the operation of the low-pass filter are the same as those of FIG. 1, and are not mentiond here. The capacitor $C_2$ and the output transistor $Q_4$ of the low-pass filter 3 have been formed in the monolithic integrated circuit as shown in FIG. 3.

Thus, the syn separator output signals Vsync having a pulse width $P'_H$ nearly equal to the pulse width $P_H$ of the horizontal syn signals in the composite video signals Vin are produced from a syn separator output terminal 13. The time constant of the low-pass filter 3 has been set to a value that the abovementioned pulse width $P'_H$ is obtained and harmonic components are removed from the horizontal syn pulse signals. Accordingly, since it is allowed to greatly reduce the quantity of harmonic components fed back from the syn separator output terminal 13 to the input terminals 1, 16 of the first video intermediate-frequency amplifier circuit 5, unstable factors such as oscillation and crosstalk can be removed.

The noise canceller circuit 10 consists of transistors $Q_{67}$ to $Q_{75}$, Zener diode $ZD_2$, resistors $R_{65}$ to $R_{71}$, $R_{73}$, and capacitors $C_{16}$ to $C_{18}$.

The AGC detector circuit 12 consists of transistors $Q_{76}$ to $Q_{86}$, diode $D_{15}$, resistors $R_{74}$ to $R_{82}$, and capacitor $C_{19}$.

The composite video signals obtained from the collector of the transistor $Q_{54}$ of the second video amplifier circuit 9b are fed to the base of the transistor $Q_{76}$ of an AGC detector circuit 11 via resistors $R_{65}$ and $R_{66}$ and base-emitter junction of the transistor $Q_{67}$ in the noise canceller circuit 10. The composite video signals are amplified by the pair of differential transistors $Q_{76}$ and $Q_{77}$ and the common emitter transistor $Q_{79}$ of the AGC detector circuit 11, and are fed to the base of the transistor $Q_{80}$. The transistor $Q_{80}$, resistors $R_{76}$ and $R_{80}$, and capacitor $C_{19}$ work as an emitter-follower-type detector for detecting peak values of horizontal syn pulse signals in the composite video signals. Therefore, the terminal 5 of the integrated circuit is maintained at a voltage nearly equal to the peak value of the horizontal syn pulse signals. The voltage is amplified by a pair of differential transistors $Q_{81}$, $Q_{82}$ of the AGC detector circuit 11, and is sent as an AGC voltage to the terminal 6 via current-mirror transistors $Q_{84}$ and $Q_{85}$.

When the AGC voltage sent from the AGC detector circuit 11 to the terminal 6 is applied to a series circuit consisting of resistor $R_{30}$ and transistor $Q_{29}$, the voltage gains of the first, second and third video intermediate-frequency amplifier circuits 5, 6 and 7 are controlled, as mentioned already.

The composite video signals obtained from the collector of the transistor $Q_{54}$ in the second video amplifier circuit 9b, on the other hand, are supplied to the base of the transistor $Q_{73}$ via the resistors $R_{65}$ and $R_{66}$ and base-emitter junction of the transistor $Q_{67}$ in the noise canceller circuit 10. Therefore, the voltage of the capacitor $C_{18}$ (voltage of terminal 10) to which is connected the emitter of the transistor $Q_{73}$ via resistor $R_{69}$ is maintained at an average value of the composite video signals. The average voltage is applied to the base of the transistor $Q_{69}$ via the base-emitter junction of the transistor $Q_{74}$ and the resistor $R_{70}$.

The composite video signals obtained from the emitter of the transistor $Q_{55}$ of the second video amplifier circuit 9b are applied to the base of the transistor $Q_{68}$ of the noise canceller circuit 10 via the resistor $R_{68}$. Therefore, when the composite video signals contain negative-going noise pulse smaller than the abovementioned average voltage applied to the base of the transistor $Q_{69}$, the transistor $Q_{68}$ is rendered off and the transistor $Q_{69}$ is rendered on during the period of noise pulses. Consequently, a heavy current flows into the current-mirror transistors $Q_{71}$ and $Q_{72}$, causing the transistor $Q_{67}$ to be turned on. When the transistor $Q_{67}$ is rendered conductive, the transistor $Q_{76}$ in the AGC detector circuit 11 is rendered conductive, and the transistors $Q_{77}$, $Q_{79}$ and $Q_{80}$ are rendered nonconductive.

Therefore, during the period of the negative-going pulses, the voltage maintained at the terminal 5 is not affected by the noise pulses. Consequently, the AGC voltage obtained from the terminal 6 is not affected by the noise pulses.

The AGC voltage of the terminal 6 is sent to an AGC amplifier circuit 12 via an RF delay-adjust circuit consisting of resistors $R_{83}$ and $R_{84}$, and capacitors $C_{20}$ and $C_{21}$, and the terminal 4. The AGC amplifier circuit 12 consists of transistors $Q_{87}$ to $Q_{97}$, diodes $D_{16}$ to $D_{19}$, Zener diode $ZD_3$, and resistors $R_{85}$ to $R_{90}$, and produces through the terminal 3 a delayed AGC signal for controlling the voltage gain of the radio-frequency amplifier circuit in the tuner which is not shown.

When the AGC voltage at the terminal 6 is high, the transistors $Q_{87}$ and $Q_{88}$ of the AGC amplifier circuit 12 are rendered conductive, and the transistors $Q_{89}$ to $Q_{92}$ non-conductive. Hence, the delayed AGC voltage at the terminal 3 is determined by a relatively small voltage from the transistor $Q_{93}$.

When the AGC voltage at the terminal 7 is lowered, the conductivities of the transistors $Q_{87}$ and $Q_{88}$ are decreased, and the conductivities of the transistors $Q_{89}$ to $Q_{92}$ are increased, whereby the delay AGC voltage at the terminal 3 is increased.

However, the rise of the delayed AGC voltage is limited by a Zener voltage of the Zener diode $ZD_3$ and by a forward voltage of the diode $D_{18}$.

What is claimed is:

1. A monolithic semiconductor integrated circuit for television receivers comprising:

a high-frequency amplifier circuit for amplifying video intermediate-frequency signals, wherein an input terminal of said high-frequency amplifier circuit is connected to an externally located input terminal of said monolithic semiconductor integrated circuit;

a video detector circuit which receives the output signals of said high-frequency amplifier circuit and produces composite video signals as detected outputs;

a syn separator circuit which receives the detected outputs of said video detector circuit and produces syn separation output signals to an externally located output terminal of said monolithic semiconductor integrated circuit; and a low-pass filter connected between said externally located output terminal and the output of said syn separator circuit, wherein the time constant of said low-pass filter has been so selected that the resulting syn separation output signals will have a pulse width nearly equal to the pulse width of horizontal syn pulses in said composite video signals and have reduced harmonic components of said horizontal syn pulses.

2. A monolithic semiconductor integrated circuit for television receivers according to claim 1, wherein said high-frequency amplifier circuit is a multistage amplifier circuit.

3. A monolithic semiconductor integrated circuit for television receivers according to claim 2, further comprising a video amplifier circuit, wherein said syn separator circuit receives the detected outputs of said video detector circuit via said video amplifier circuit.

4. A monolithic semiconductor integrated circuit for television receivers according to claim 3, further comprising:
   an automatic gain control detector circuit which receives composite video signals from said video amplifier circuit, wherein the gain of said high-frequency amplifier circuit is controlled by an automatic gain control voltage produced by said automatic gain control detector circuit; and
   an automatic gain control amplifier circuit which receives said automatic gain control voltage and produces a delay gain control voltage to the other externally located terminal of said monolithic semiconductor integrated circuit.

5. A monolithic semiconductor integrated circuit for television receivers according to claim 4, further comprising a noise canceller circuit which is connected between said video amplifier circuit and said automatic gain control detector circuit.

6. A monolithic semiconductor integrated circuit for television receivers according to claim 5, further comprising an emitter-follower output circuit which is connected between said low-pass filter and said externally located output terminal.

7. A television receiver to which is applied a monolithic semiconductor integrated circuit according to any one of claims 1 to 5, comprising:
   a high-pass filter which is connected to said externally located output terminal of said monolithic semiconductor integrated circuit to obtain horizontal syn signals; and
   another low-pass filter and a slicer circuit which are connected to said externally located output terminal to obtain vertical syn signals.

* * * * *